R. T. HALL.
METHOD OF MANUFACTURE OF CLAY MUGS, &c.
APPLICATION FILED MAR. 18, 1920.
1,344,885.
Patented June 29, 1920.
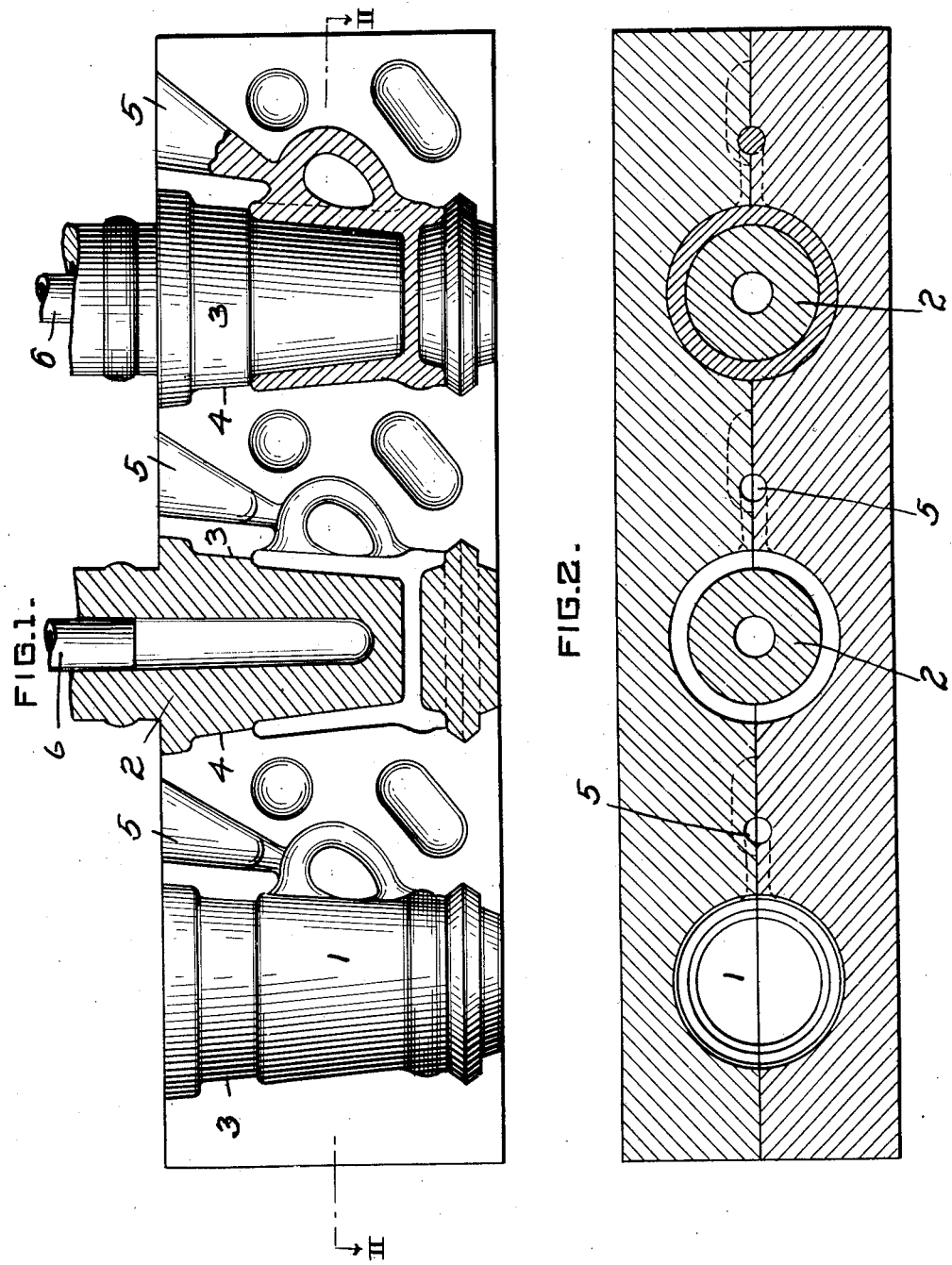
WITNESSES
INVENTOR

UNITED STATES PATENT OFFICE.

ROBERT T. HALL, OF EAST LIVERPOOL, OHIO.

METHOD OF MANUFACTURE OF CLAY MUGS, &c.

1,344,885.  Specification of Letters Patent.  Patented June 29, 1920.

Application filed March 18, 1920. Serial No. 366,794.

*To all whom it may concern:*

Be it known that I, ROBERT T. HALL, residing at East Liverpool, State of Ohio, a citizen of the United States, have invented or discovered certain new and useful Improvements in Methods of Manufacture of Clay Mugs, &c., of which improvements the following is a specification.

In making cups, mugs, and other like articles from clay, it is the practice to bring the clay to such a condition of plasticity that a mass thereof may be caused to conform to the walls of a mold or matrix by a suitable spreading tool. While this method is effective to impart the desired shape both externally and internally, the thickness of the walls and bottom of the article can be made to conform only approximately to a desired standard and hence it is not unusual for articles of the same class to vary two or three ounces in capacity. The object of the invention described herein is to provide a method of manufacturing whereby all cups or other like articles will conform as regards wall thickness, capacity, etc., to a predetermined standard. The invention is hereinafter more fully described and claimed.

In the accompanying drawings forming a part of this specification, Figure 1 is a view partly in elevation and partly in section of a mold suitable for the practice of the invention, and Fig. 2 is a sectional plan view of the same.

In the practice of the invention the matrix or matrices 1 for the article or articles are formed in a block of plaster of Paris or other suitable material which will absorb moisture from the clay, said block being made in sections as usual for the removal of the completed article. Within the matrix is placed a core 2, which is so formed of plaster of Paris or other suitable material that it will not only absorb moisture from the clay but will also be permeable by a gaseous fluid such as air. This core is made hollow, the dimensions and shape of the opening in the core being such that the walls of the core will be approximately equal at all points.

In making cups, mugs, or other hollow articles, the mold sections are placed together and the core or cores inserted, said cores having shoulders or enlargements 3 adapted to fit in seats 4 and close the upper end of the matrix. The clay which is made sufficiently liquid to flow freely, is poured into the mold through gates 5 completely filling the matrix. The moisture will be rapidly absorbed by the mold and core, the clay becoming proportionally stiff and hard. During this drying out process, the clay will contract and tend to adhere tightly to the core. In order to prevent or overcome such adherence of the clay to the core, the opening in the core is connected to a source of air or other gaseous fluid under pressure. This air will pass through the walls of the core and, loosening the clay from the core, will form a thin film of air between the core and the inner surface of the article so that the core can be easily withdrawn. In the form of apparatus shown, a tapering nozzle 6 connected by a pipe to a suitable source of fluid under pressure is employed for directing the gaseous fluid into the core.

While it is probable that the pressure of the gaseous fluid passing through the core will exert a substantially compacting or condensing effect on the clay, its principal purpose is to relieve the grip of the hardening clay on the core and to provide an air film between the core and the inner surface of the article.

I claim herein as my invention:

The method herein described of forming hollow articles from clay which consists in filling the matrix formed by a mold and core of liquid absorbent material, with liquid clay, and forcing a gaseous fluid through the core to relieve the grip of the hardening clay on the core.

In testimony whereof I have hereunto set my hand.

ROBERT T. HALL.